United States Patent
Hung et al.

(10) Patent No.: US 7,916,440 B2
(45) Date of Patent: Mar. 29, 2011

(54) POWER INTERFACE CIRCUIT AND ELECTRONIC DEVICE USING THE SAME

(75) Inventors: Chun-Lung Hung, Taipei Hsien (TW); Tao Wang, Shenzhen (CN); Shi-Ming Zhang, Shenzhen (CN); Wang-Chang Duan, Shenzhen (CN); Wen-Ming Chen, Shenzhen (CN); Pei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 417 days.

(21) Appl. No.: 12/147,503

(22) Filed: Jun. 27, 2008

(65) Prior Publication Data

US 2009/0147419 A1    Jun. 11, 2009

(30) Foreign Application Priority Data

Dec. 6, 2007   (CN) .......................... 2007 1 0202870

(51) Int. Cl.
*H02H 9/00* (2006.01)
(52) U.S. Cl. ...................................................... 361/56
(58) Field of Classification Search ................ 361/118, 361/56
See application file for complete search history.

(56) References Cited

U.S. PATENT DOCUMENTS

| 4,023,071 | A | * | 5/1977 | Fussell ............................ 361/56 |
| 4,455,586 | A | * | 6/1984 | McCartney ..................... 361/56 |
| 4,758,920 | A | * | 7/1988 | McCartney ................... 361/119 |
| 5,543,999 | A | * | 8/1996 | Riley .............................. 361/119 |
| 5,644,211 | A | * | 7/1997 | Tokuyama ..................... 320/162 |
| 6,101,080 | A | * | 8/2000 | Kuhne ............................ 361/119 |
| 6,771,179 | B1 | * | 8/2004 | Post et al. ..................... 340/653 |
| 7,221,550 | B2 | * | 5/2007 | Chang et al. .................. 361/118 |
| 7,446,992 | B2 | * | 11/2008 | Terada et al. ................. 361/117 |
| 7,576,965 | B2 | * | 8/2009 | Terada et al. ................. 361/118 |
| 7,610,501 | B2 | * | 10/2009 | Turner et al. .................. 713/340 |
| 2002/0145843 | A1 | * | 10/2002 | Parada et al. ................. 361/111 |
| 2004/0145849 | A1 | * | 7/2004 | Chang et al. ................. 361/120 |
| 2008/0144242 | A1 | | 6/2008 | Lai |
| 2009/0147419 | A1 | * | 6/2009 | Hung et al. .................... 361/56 |

FOREIGN PATENT DOCUMENTS

| CN | 1558451 A | 12/2004 |
| CN | 2671235 Y | 1/2005 |
| CN | 1719607 A | 1/2006 |

* cited by examiner

*Primary Examiner* — Ronald W Leja
(74) *Attorney, Agent, or Firm* — Frank R. Niranjan

(57) ABSTRACT

An electronic device includes an integrated circuit, a power interface, and an interface circuit connected between the integrated circuit and the power interface for protecting the integrated circuit from being damaged by electrostatic discharge. The interface circuit includes a current limit unit connected between the power interface and the integrated circuit for limiting an electrostatic discharge current and an electrostatic protection unit connected to a common node of the power interface and the current limit unit for clamping a voltage of the common node to a predetermined value. A related integrated circuit is also provided.

11 Claims, 4 Drawing Sheets

POWER INTERFACE CIRCUIT AND ELECTRONIC DEVICE USING THE SAME

BACKGROUND

1. Field of the Invention

The present invention relates to electronic devices, and particularly to an electronic device using a power interface circuit for preventing the electronic device from being damaged by electrostatic discharge (ESD).

2. Description of Related Art

Integrated circuits (IC) are widely used in electronic devices for processing data or power management. Integrated circuits are made from semiconductor materials, such as silicon, and insulating materials, such as silicon dioxide. Either of these materials can suffer permanent damage when subjected to high voltages generated from electrostatic discharge (ESD). Take a portable DVD player as an example, a power management IC mounted in the portable DVD player is connected to a power interface for receiving electric power from an external alternating current (AC) adapter or a battery. Generally, the power interface includes some conductive pins for contacting the AC adapter or the battery. The conductive pins are exposed for conveniently contacting the AC adapter or the battery. However, the exposed conductive pins are easy to be touched by a user, and static electricity accumulated on the user may damage the power management IC via ESD.

Therefore, an improved electronic device and its power interface circuit are needed to address the aforementioned deficiency and inadequacies.

SUMMARY

An electronic device includes an integrated circuit, a power interface, and an interface circuit connected between the integrated circuit and the power interface for protecting the integrated circuit from being damaged by electrostatic discharge. The interface circuit includes a current limit unit connected between the power interface and the integrated circuit for limiting an electrostatic discharge current and an electrostatic protection unit connected to a common node of the power interface and the current limit unit for clamping a voltage of the common node to a predetermined value. A related integrated circuit is also provided.

Other advantages and novel features of the present invention will become more apparent from the following detailed description of preferred embodiment when taken in conjunction with the accompanying drawings.

DETAILED DESCRIPTION OF THE EMBODIMENTS

Reference will now be made to the drawings to describe an exemplary embodiment of the present electronic device and its power interface circuit.

Figure 1:
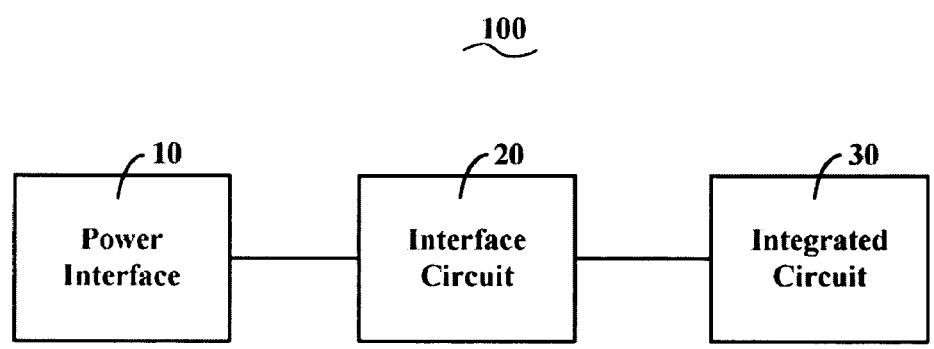
FIG. 1 is a schematic block diagram of an electronic device in accordance with an exemplary embodiment, and the electronic device includes an interface circuit.

Referring to FIG. 1, in an exemplary embodiment, an electronic device 100 includes a power interface 10, an interface circuit 20, and an integrated circuit (IC) 30. The interface circuit 20 is connected between the power interface 10 and the IC 30 for protecting the IC 30 from being damaged by electrostatic discharge (ESD).

Figure 2:
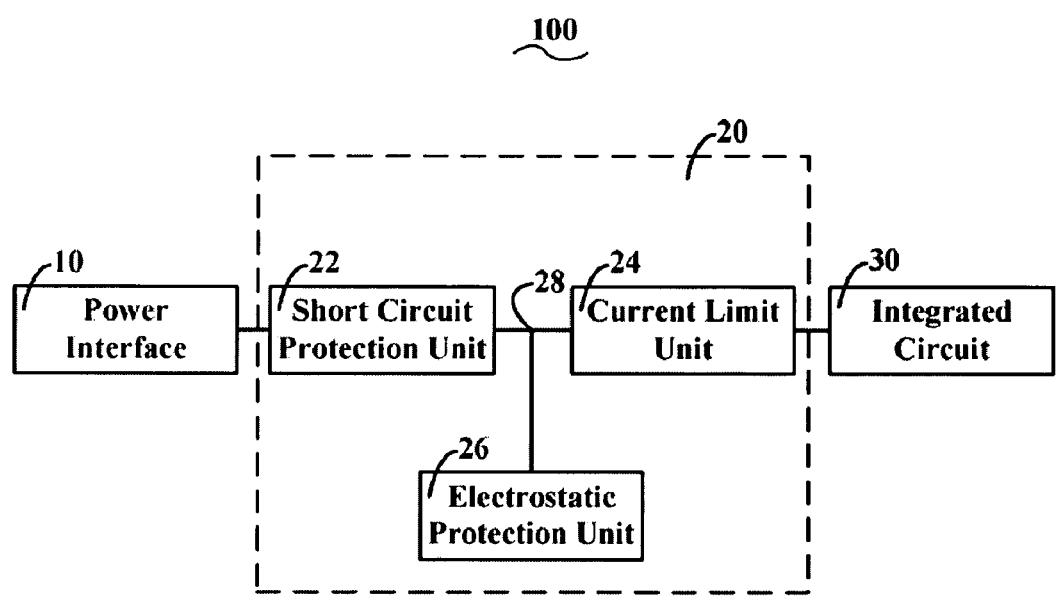
FIG. 2 is a schematic block diagram of the interface circuit in FIG. 1.

FIG. 2 shows a detailed block diagram of the interface circuit 20. The interface circuit 20 includes a short circuit protection unit 22, a current limit unit 24, and an electrostatic protection unit 26. The short circuit protection unit 22 and the current limit unit 24 are connected in series between the power interface 10 and the IC 30. The electrostatic protection unit 26 is coupled to a common node 28 of the short circuit protection unit 22 and the current limit unit 24.

The short circuit protection unit 22 is connected to the power interface 10 for protecting the electrostatic protection unit 26 and the IC 30. When an accidental low-resistance connection (i.e., short circuit) between two conductive pins in the power interface 10 occurs, resulting in an excessive electric current, the short circuit protection unit 22 protects the electrostatic protection unit 26 and the IC 30 because the short circuit protection unit 22 has electrical resistance. That is, the short circuit protection unit 22 prevents the excessive electric current from being generated and flowing through the electrostatic protection unit 26 or the IC 30.

The current limit unit 24 is connected between the common node 28 and the IC 30 for limiting an ESD current. When conductive pins become touched by an object (e.g., user's finger), an ESD event may occur and the ESD current is generated accordingly. The current limit unit 24 has a high resistance for limiting the ESD current to a safe value.

The electrostatic protection unit 26 is configured for clamping a voltage of the common node 28 at a predetermined value, so as to protect the IC 30 from the damage caused by ESD. Generally, during an ESD process, a high voltage (e.g., 10 KV) is generated momentarily. The electrostatic protection unit 26 clamps the voltage of the node 28 at the predetermined value when the high voltage is applied to the power interface 10. The predetermined value is set to be lower than a threshold value that can damage the IC 30.

Figure 3:
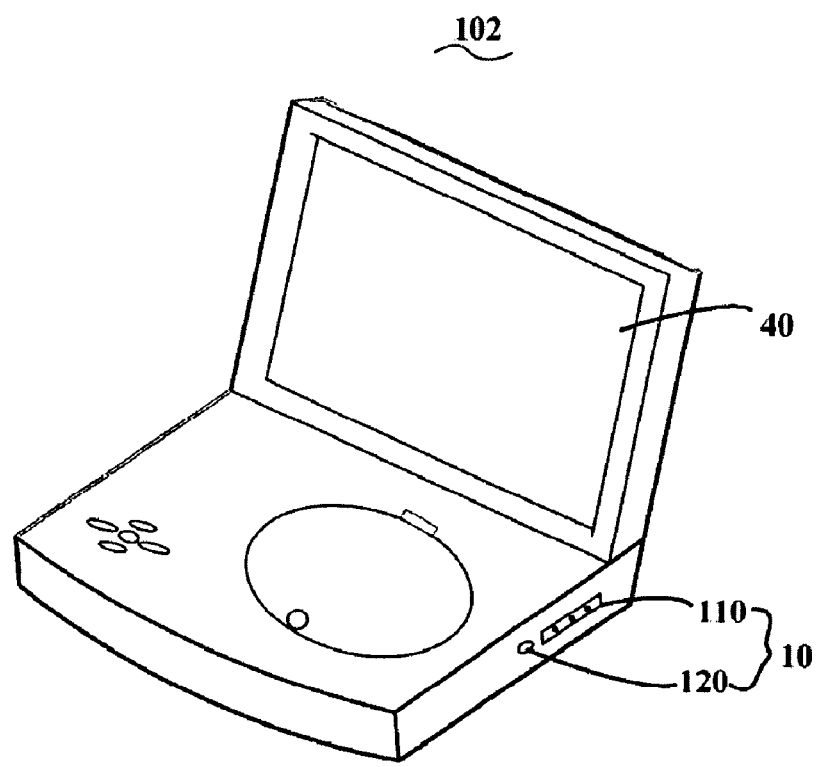
FIG. 3 is a schematic diagram of a portable DVD player.

The interface circuit 20 can be implemented in many kinds of electronic devices, such as notebook computers, handheld game players, and portable DVD players. For example, a portable DVD player 102 (shown in FIG. 3) includes the power interface 10, the interface circuit 20, and the IC 30. The IC 30 is used for managing power in the portable DVD player 102 (e.g., power supply of a display screen 40 is controlled by the IC 30). The power interface 10 includes a battery port 110 for connecting a battery and an adapter port 120 for connecting an adaptor.

Figure 4:
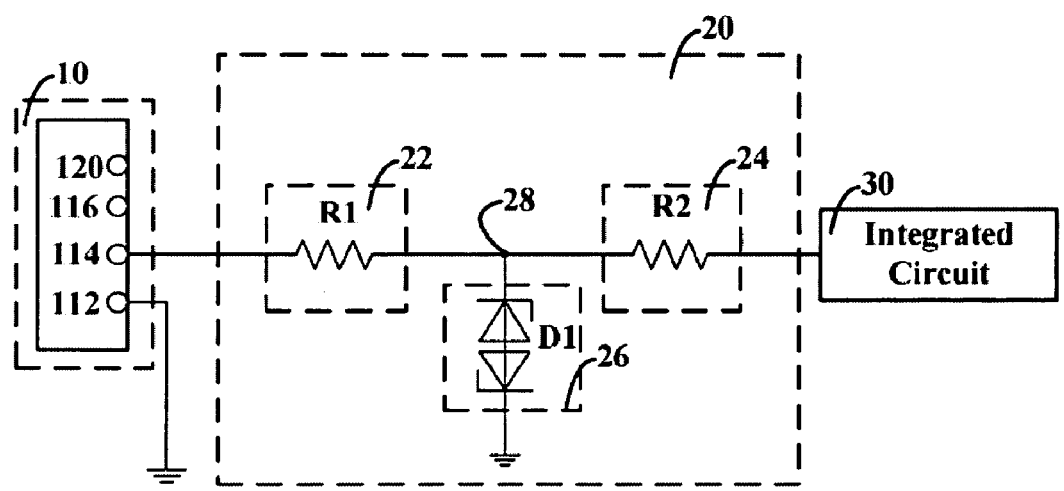
FIG. 4 is a schematic diagram of the interface circuit in FIG. 1.

The battery port 110 includes a ground pin 112, a detect pin 114, and a positive pin 116 (shown in FIG. 4). The ground pin 112 is grounded. The detect pin 114 is used for detecting states of the battery. The positive pin 116 is configured for contacting a positive electrode of the battery. The short circuit protection unit 22 includes a first resistor R1 (e.g., 100Ω) with an end connected to the detect pin 114. The current limit unit 24 includes a second resistor R2 (e.g., 20 KΩ) connected between another end of the first resistor R1 and the IC 30. The electrostatic protection unit 26 includes a bidirectional ESD protection diode D1. One end of D1 is grounded, and another end of D1 is connected to the common node 28 of the first resistor R1 and the second resistor R2.

When the detect pin 114 is contacted by an object carrying electric charge, the high voltage generated during the ESD process is applied on the detect pin 114. The bidirectional ESD protection diode D1 clamps the voltage of the node 28 to the predetermined value. The predetermined value is set to be lower than the threshold value that will damage the IC 30. The second resistor R2 connected between the common node 28 and the IC 30 is used for limiting the ESD current and preventing a large ESD current from flowing to the IC 30. In particular, when the high voltage applied to the detect pin 114 is positive, because a resistance value of the second resistor R2 is much greater than that of the bidirectional ESD protection diode D1 during the ESD process, the ESD current is mostly directed to ground through the bidirectional ESD protection diode D1 while a remainder of the ESD current is restricted to a safe value and flows to the IC 30. In contrast, when the high voltage applied on the detect pin 114 is negative, most part of the ESD current flows from the ground to the object through the bidirectional ESD protection diode D1 and a minor part of the ESD current flows from the IC 30 to the object.

If a short circuit between the detect pin 114 and the positive pin 116 is established accidentally, the first resistor R1 protects the bidirectional ESD protection diode D1 and the IC 30 because the first resistor R1 prevents an excessive electric current from being generated thereby protecting the bidirectional ESD protection diode D1 from damage by preventing excessive current from flowing through the bidirectional ESD protection diode D1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising:
    an integrated circuit;
    a power interface for receiving and transmitting power supply to the integrated circuit, the power interface exposed outside of the electronic device, the power interface comprising a detect pin for detecting a state of a battery; and
    an interface circuit connected between the integrated circuit and the power interface for protecting the integrated circuit from being damaged by electrostatic discharge, the interface circuit comprising:
    a short circuit protection unit having electrical resistance connected to the power interface;
    a current limit unit connected between the short circuit protection unit and the integrated circuit for limiting an electrostatic discharge current; and
    an electrostatic protection unit connected to a common node of the short circuit protection unit and the current limit unit for clamping a voltage of the common node to a predetermined value, the common node connected to the detect pin.

2. The electronic device as claimed in claim 1, wherein the short circuit protection unit comprises a resistor.

3. The electronic device as claimed in claim 1, wherein the current limit unit comprises a resistor.

4. The electronic device as claimed in claim 1, wherein the electrostatic protection unit comprises a bidirectional electrostatic discharge protection diode.

5. The electronic device as claimed in claim 4, wherein a resistance value of the current limit unit is greater than that of the bidirectional electrostatic discharge protection diode during an electrostatic discharge process.

6. The electronic device as claimed in claim 1, wherein the power interface further comprises a ground pin for connecting to ground and a positive pin for connecting a positive electrode of the battery.

7. An electronic device, comprising:
    an integrated circuit;
    a power interface for receiving and transmitting power supply to the integrated circuit, the power interface exposed outside of the electronic device, the power interface comprising a detect pin for detecting a state of a battery; and
    an interface circuit connected between the integrated circuit and the power interface for protecting the integrated circuit from being damaged by electrostatic discharge, the interface circuit comprising:
    a current limit unit connected between the power interface and the integrated circuit for limiting an electrostatic discharge current; and
    an electrostatic protection unit connected to a common node of the power interface and the current limit unit for clamping a voltage of the common node to a predetermined value, the common node connected to the detect pin.

8. The electronic device as claimed in claim 7, wherein the current limit unit comprises a resistor.

9. The electronic device as claimed in claim 7, wherein the electrostatic protection unit comprises a bidirectional electrostatic discharge protection diode.

10. The electronic device as claimed in claim 9, wherein a resistance value of the current limit unit is greater than that of the bidirectional electrostatic discharge protection diode during an electrostatic discharge process.

11. The electronic device as claimed in claim 7, wherein the power interface further comprises a ground pin for connecting to ground and a positive pin for connecting a positive electrode of the battery.

\* \* \* \* \*